United States Patent
Tang (10) Patent No.: US 12,058,564 B2
(45) Date of Patent: Aug. 6, 2024

(54) DATA REPLICATION TRANSMISSION CONFIGURATION METHOD, APPARATUS, CHIP, AND COMPUTER PROGRAM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 586 days.

(21) Appl. No.: 17/219,726

(22) Filed: Mar. 31, 2021

(65) Prior Publication Data

US 2021/0250810 A1 Aug. 12, 2021

Related U.S. Application Data

(63) Continuation of application No. PCT/CN2019/072002, filed on Jan. 16, 2019.

(51) Int. Cl.
| | |
|---|---|
| *H04W 48/06* | (2009.01) |
| *H04L 5/00* | (2006.01) |
| *H04W 28/06* | (2009.01) |
| *H04W 76/11* | (2018.01) |
| *H04W 80/02* | (2009.01) |

(52) U.S. Cl.
CPC ........... *H04W 28/06* (2013.01); *H04L 5/0098* (2013.01); *H04W 76/11* (2018.02); *H04W 80/02* (2013.01)

(58) Field of Classification Search
CPC ..... H04L 5/0098; H04L 1/08; H04L 41/0803; H04L 67/1095; H04W 28/06; H04W 76/11; H04W 80/02; H04W 76/15; H04W 76/19; H04W 16/18; H04W 28/0205; H04W 28/04; H04W 72/20

See application file for complete search history.

(56) References Cited

U.S. PATENT DOCUMENTS

| | | | |
|---|---|---|---|
| 2018/0176974 A1* | 6/2018 | Fujishiro | ................. H04L 5/001 |
| 2018/0228438 A1* | 8/2018 | Kaskoun | .............. A61B 5/6833 |

(Continued)

FOREIGN PATENT DOCUMENTS

| | | |
|---|---|---|
| CN | 108631980 A | 10/2018 |
| CN | 108810990 A | 11/2018 |

(Continued)

OTHER PUBLICATIONS

"Packet Duplication in Dual Connectivity Enabled 5G Wireless Networks: Overview and Challenges"; Aijaz; IEEE Communications Standards Magazine ( vol. 3, Issue: 3, Sep. 2019) (Year: 2019).*

(Continued)

*Primary Examiner* — Benjamin H Elliott, IV
(74) *Attorney, Agent, or Firm* — PERKINS COIE LLP (57) ABSTRACT

The present application discloses a data replication transmission configuration method, an apparatus, a chip and a computer program. Said method comprises: a network device configuring a terminal device with data replication transmission information, wherein corresponding to one bearer, at least two logical channels can be used for data replication transmission, and the data replication transmission information is used by the terminal device to perform data replication transmission.

13 Claims, 6 Drawing Sheets

A terminal device acquires data duplication and transmission information configured by a network device, wherein corresponding to one bearer, a quantity of logical channels available to data duplication and transmission is at least two — 801

The terminal device performs data duplication and transmission according to the data duplication and transmission information — 802

(56) References Cited

U.S. PATENT DOCUMENTS

| | | | |
|---|---|---|---|
| 2018/0309660 A1* | 10/2018 | Loehr | H04L 45/14 |
| 2018/0310202 A1* | 10/2018 | Löhr | H04W 28/065 |
| 2018/0324642 A1* | 11/2018 | Yu | H04L 5/0053 |
| 2018/0368200 A1* | 12/2018 | Jin | H04L 1/189 |
| 2019/0098533 A1* | 3/2019 | Babaei | H04L 1/08 |
| 2020/0186292 A1* | 6/2020 | Zou | H04W 76/15 |
| 2021/0184788 A1* | 6/2021 | Lu | H04L 1/0025 |
| 2021/0250139 A1* | 8/2021 | Zhang | H04W 76/15 |
| 2021/0250810 A1* | 8/2021 | Tang | H04L 5/0098 |
| 2021/0251031 A1* | 8/2021 | Zhang | H04L 1/22 |
| 2022/0141707 A1* | 5/2022 | Miao | H04W 76/20 370/329 |

FOREIGN PATENT DOCUMENTS

| | | |
|---|---|---|
| CN | 108811117 A | 11/2018 |
| EP | 3833071 A1 | 6/2021 |
| EP | 3876659 A1 | 9/2021 |
| KR | 20180108389 A | 10/2018 |
| WO | 2015141845 A1 | 9/2015 |
| WO | 2018164499 A1 | 9/2018 |
| WO | 2018171734 A1 | 9/2018 |
| WO | 2018200565 A1 | 11/2018 |
| WO | 2018200584 A1 | 11/2018 |
| WO | 2018207102 A1 | 11/2018 |
| WO | 2020124384 A1 | 6/2020 |

OTHER PUBLICATIONS

"Packet Duplication for URLLC in 5G Dual Connectivity Architecture"; Rao et al.; 2018 IEEE Wireless Communications and Networking Conference (WCNC); Jun. 2018 (Year: 2018).*

CN111130722 Chinese publication of Chinese application No. 201811285532.9, published May 8, 2020 (retrieved from WIPO website, https://patentscope.wipo.int/search/en/detail.jsf?docId=CN295318385&_fid=US333355517 (Year: 2018).*

CN111130722 English translation of Chinese publication of Chinese application No. 201811285532.9, published May 8, 2020 (retrieved from WIPO website, https://patentscope.wipo.int/search/en/detail.jsf?docId=CN295318385&_fid=US333355517 (Year: 2018).*

Examination Report for European Application No. 19910509.9 issued Nov. 16, 2022. 9 pages.

Huawei "Discussion on SRB duplication and LCID" R3-186683; 3GPP TSG-RAN WG3 #102; Spokane, WA, USA; Nov. 12-16, 2019. 3 pages.

Request for the Submission of an Opinion for Korean Application No. 10-2021-7014236 issued Dec. 14, 2022. 10 pages with English translation.

3GPP TSG RAN meeting #81-RP-182090—Gold Coast, Australia, Sep. 10-13, 2018—Nokia, Nokia Shanghai Bell, Revised SID: Study on NR Industrial Internet of Things (IoT) (10 pages).

International Search Report issued Oct. 8, 2019 of PCT/CN2019/072002 (4 pages).

Examination Report for Indian Application No. 202117015564 issued Feb. 6, 2022. 7 pages with English translation.

Examination Report No. 1 for Australian Application No. 2019422019 issued Mar. 8, 2022. 3 pages.

Examination Report of the European application No. 19910509.9, issued on May 17, 2022. 5 pages.

First Office Action of the Chinese application No. 202110488038.8, issued on Jun. 30, 2022. 12 pages with English Translation.

First Office Action of the Korean application No. 10-2021-7014236, issued on Jun. 8, 2022. 10 pages with English Translation.

Extended European Search Report for European Application No. 19910509.9 issued Sep. 24, 2021. 7 pages.

* cited by examiner

DATA REPLICATION TRANSMISSION CONFIGURATION METHOD, APPARATUS, CHIP, AND COMPUTER PROGRAM

This application is a continuation application of International PCT Application No. PCT/CN2019/072002 filed on Jan. 16, 2019, the entire content of which is hereby incorporated by reference.

TECHNICAL FIELD

The present disclosure relates to a wireless network technology, in particular to a method for configuring data duplication and transmission, an apparatus, a chip and a computer program.

BACKGROUND

Data duplication and transmission refers to sending a data packet through multiple links in parallel at a higher layer, so a receiving end can receive the data packet correctly with high probability.

Data duplication may be performed at a Packet Data Convergence Protocol (PDCP) layer. Same PDCP Protocol Data Units (PDUs) are respectively mapped to different Radio Link Control (RLC) Entities, and a Media Access Control (MAC) entity may transmit duplicate data of different RLC entities to different Physical Carriers.

At present, data duplication and transmission is configured based on a bearer, and different bearers may be configured to support data duplication and transmission, or data duplication and transmission may not be configured.

However, this bearer-level-based configuration will cause data that does not need to be duplicated and transmitted to be duplicated and transmitted, thereby resulting in that transmission rate of actually effective data is limited in a case of limited air interface resources. For example, in a New Radio (NR) system, due to the support of a Time Sensitive Network (TSN) service, it is even necessary to complete data transmission within 0.5 ms. If duplicated and transmitted data packets are not needed but transmission of multiple duplicates are activated, waste of air interface resources will be caused, and low data transmission rate will be resulted in, and even Quality of Service (QOS) cannot be ensured finally, etc.

SUMMARY

In view of this, implementations of the present disclosure provide a method for configuring data duplication and transmission, an apparatus, a chip and a computer program.

In a first aspect, a method for configuring data duplication and transmission is provided, including: configuring, by a network device, data duplication and transmission information for a terminal device, wherein corresponding to one bearer, a quantity of logical channels available to data duplication and transmission is at least two: the data duplication and transmission information is used for performing data duplication and transmission by the terminal device.

In a second aspect, a method for configuring data duplication and transmission is provided, including: acquiring, by a terminal device, data duplication and transmission information configured by a network device, wherein corresponding to one bearer, a quantity of logical channels available to data duplication and transmission is at least two: performing, by the terminal device, data duplication and transmission according to the data duplication and transmission information.

In a third aspect, an apparatus for configuring data duplication and transmission is provided, which is configured to execute the method in the above first aspect or in each implementation thereof.

Specifically, the apparatus for configuring data duplication and transmission includes functional modules for executing the method in the above first aspect or in each implementation thereof.

In a fourth aspect, an apparatus for configuring data duplication and transmission is provided, configured to execute the method in the above second aspect or in each implementation thereof.

Specifically, the apparatus for configuring data duplication and transmission includes functional modules for executing the method in the above second aspect or in each implementation thereof.

In a fifth aspect, a communication device is provided, including a processor and a memory, wherein the memory is configured to store a computer program, and the processor is configured to call and run the computer program stored in the memory to execute the method in any one of the above first to second aspects or in each implementation thereof.

In a sixth aspect, a chip is provided, configured to implement the method in any one of the above first to second aspects or in each implementation thereof.

Specifically, the chip includes: a processor, configured to call and run a computer program from a memory to cause a device in which the chip is installed to execute the method in any one of the above first to second aspects or in each implementation thereof.

In a seventh aspect, a computer-readable storage medium is provided, configured to store a computer program, wherein the computer program causes a computer to perform the method in any one of the above first to second aspects or in each implementation thereof.

In an eighth aspect, a computer program product is provided, including computer program instructions, wherein the computer program instructions cause a computer to execute the method in any one of the above first to second aspects or in each implementation thereof.

In a ninth aspect, a computer program is provided, causing, when being run on a computer, the computer to perform the method in any one of the above first to second aspects or in each implementation thereof.

DETAILED DESCRIPTION

Technical solutions in implementations of the present disclosure will be described below with reference to the drawings in implementations of the present disclosure. It is apparent that the implementations described are just a part of implementations of the present disclosure, but not all implementations of the present disclosure. According to the implementations of the present disclosure, all other implementations achieved by a person of ordinary skills in the art without paying an inventive effort belong to the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD) system, a Universal Mobile Telecommunication System (UMTS), a Worldwide Interoperability for Microwave Access (WiMAX) communication system, or a 5G system, etc.

Figure 1:
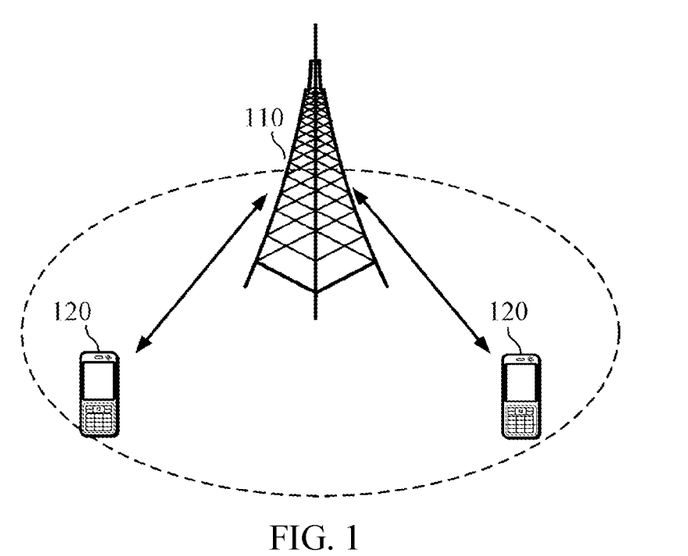
FIG. 1 is a schematic diagram of architecture of a communication system according to an implementation of the present disclosure.

Illustratively, FIG. 1 is a schematic diagram of architecture of a communication system according to an implementation of the present disclosure. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, an apparatus configured to receive/send a communication signal via a wired line connection, for example, via Public Switched Telephone Networks (PSTN), a Digital Subscriber Line (DSL), a digital cable, a direct cable: and/or another data connection/network: and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communications System (PCS) terminal which may combine a cellular radio telephone and data processing, faxing, and data communication abilities, a PDA that may include a radio telephone, a pager, an Internet/intranet access, a Web browser, a memo pad, a calendar, and/or a Global Positioning System (GPS) receiver, and a conventional laptop and/or palmtop receiver or another electronic apparatus including a radio telephone transceiver.

The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, a 5G system or a 5G network may also be called an NR system or an NR network.

The technical solutions of the implementations of the present disclosure may be applied to unlicensed spectrum or licensed spectrum, which is not limited in the implementations of the present disclosure.

FIG. 1 shows one network device and two terminal devices as an example. Optionally, the communication system 100 may include multiple network devices, and another quantity of terminal devices may be included within the coverage area of each network device, and this is not limited in the implementations of the present disclosure.

Optionally, the communication system 100 may further include other network entities such as a network controller or a mobile management entity, etc., which is not limited in the implementations of the present disclosure.

It should be understood that devices with a communication function in a network/system may be referred to as communication devices in the implementations of the present disclosure. Taking the communication system 100 shown in FIG. 1 as an example, communication devices may include a network device 110 and a terminal device 120 which have a communication function, and the network device 110 and the terminal device 120 may be the specific devices described above, which will not be repeated here. The communication devices may also include other devices in the communication system 100, e.g., other network entities such as a network controller or a mobile management entity, etc., which is not limited in the implementations of the present disclosure.

It should be understood that the terms "system" and "network" are often used interchangeably herein. The term "and/or" herein is merely an association relationship describing associated objects, indicating that there may be three relationships, for example, A and/or B may indicate three cases: A alone, A and B, and B alone. In addition, the symbol "/" herein generally indicates that objects before and after the symbol "/" have an "or" relationship.

In an implementation of a method for configuring data duplication and transmission disclosed in the present disclosure, a network device may configure data duplication and transmission information for a terminal device, wherein corresponding to one bearer, a quantity of logical channels (each logical channel corresponds to an RLC entity respectively) available to data duplication and transmission is at least two, and the data duplication and transmission information is used for performing data duplication and transmission by the terminal device.

In existing methods, corresponding to one bearer, a quantity of logical channels available to data duplication and transmission is at most two.

Figure 2:
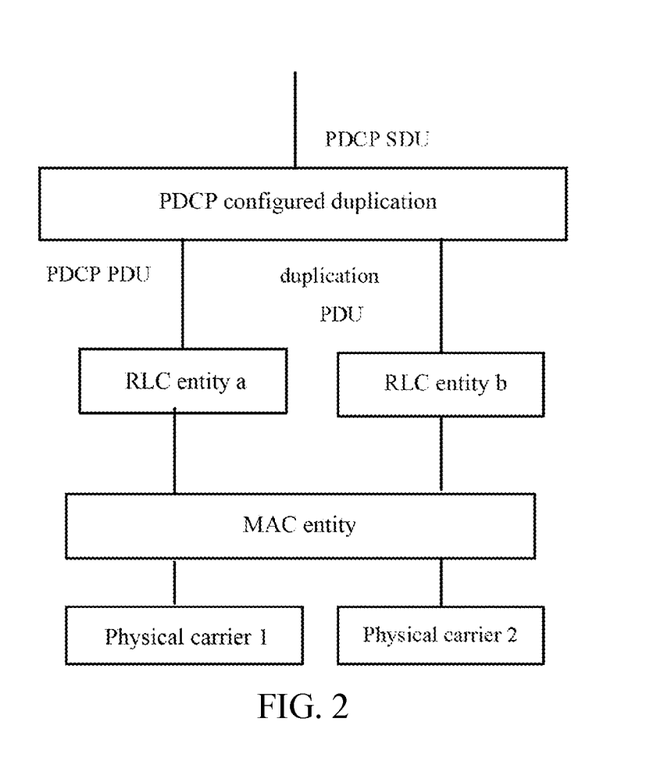
FIG. 2 is a schematic diagram of a data duplication and transmission mode in an existing CA scenario.

FIG. 2 is a schematic diagram of a data duplication and transmission mode in an existing Carrier Aggregation (CA) scenario. As shown in FIG. 2, data of two PDUs (including an original PDCP PDU and a duplicated PDU) are respectively transmitted to two RLC entities, which are RLC entity a and RLC entity b (corresponding to two different logical channels), and it is finally ensured that the two PDCP PDUs can be transmitted on different physical layer carriers, thus achieving frequency diversity gain to improve reliability or the like of data transmission.

Figure 3:
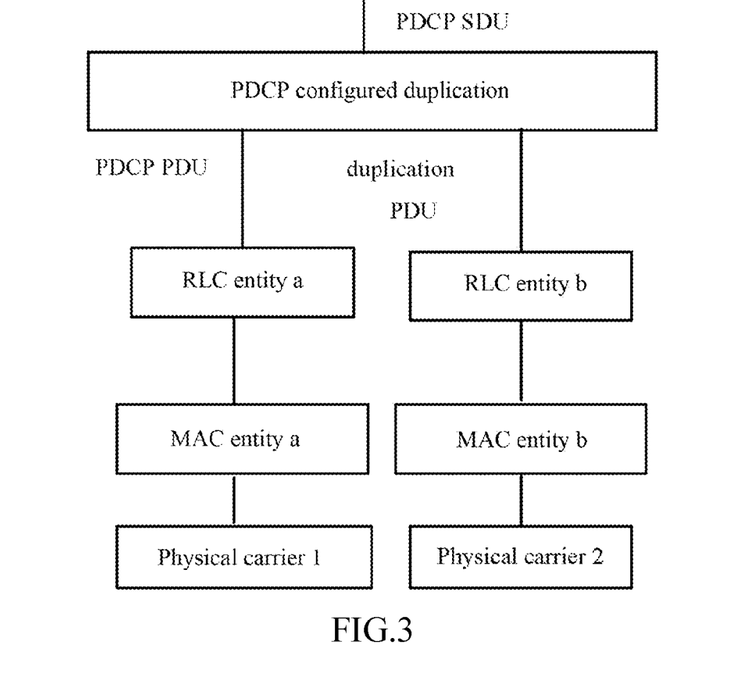
FIG. 3 is a schematic diagram of a data duplication and transmission mode in an existing DC scenario.

FIG. 3 is a schematic diagram of a data duplication and transmission mode in an existing Dual Connectivity (DC) scenario. As shown in FIG. 3, data of two PDUs (including an original PDCP PDU and a duplicated PDU) are respectively transmitted to two RLC entities, which are RLC entity a and RLC entity b, wherein the RLC entity a and the RLC entity b correspond to different MAC entities respectively.

And in the present implementation, corresponding to one bearer, a quantity of logical channels available to data duplication and transmission may be greater than two, e.g., it may be four.

When the quantity of logical channels available to data duplication and transmission is greater than two, due to an increase in duplicates that support transmission at the same time, transmission reliability may be further improved. In addition, when the quantity of logical channels available to data duplication and transmission is greater than two, the quantity of logical channels activated at the same time or used for duplicating data transmission may also be two, so that the logical channels, used by a sending end, for transmitting duplicate data may be flexibly selected, and frequent Radio Resource Control (RRC) reconfiguration procedures, signaling overhead caused by RRC reconfiguration may be reduced, etc.

Figure 4:
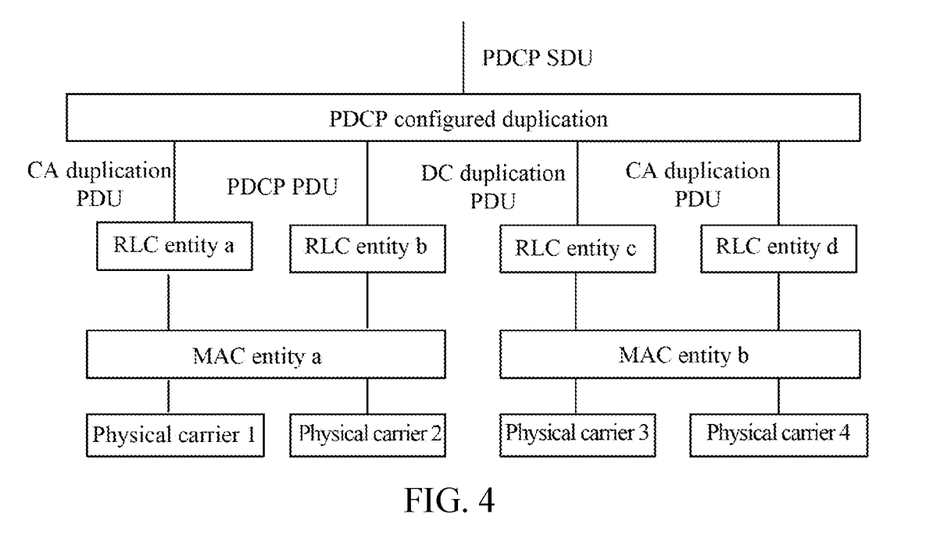
FIG. 4 is a first schematic diagram of a data duplication and transmission mode when a quantity of available logical channels is greater than two according to an implementation of the present disclosure.

For one bearer, the quantity of logical channels available to data duplication and transmission is greater than two, including, but not limited to, the cases shown in FIGS. 4 to 7. FIG. 4 is a first schematic diagram of a mode for duplicating and transmitting data when a quantity of available logical channels is greater than two according to an implementation of the present disclosure. As shown in FIG. 4, MAC entity a and MAC entity b respectively correspond to two RLC entities, wherein the MAC entity a corresponds to RLC entity a and RLC entity b, and the MAC entity b corresponds to RLC entity c and RLC entity d. PDU data transmitted by the RLC entity a may be obtained by CA duplication of PDCP PDU data transmitted by the RLC entity b, PDU data transmitted by the RLC entity c may be obtained by DC duplication of PDCP PDU data corresponding to the RLC entity b, PDU data transmitted by the RLC entity d may be obtained by CA duplication of PDU data corresponding to the RLC entity c, the MAC entity a transmits PDU data transmitted by the RLC entity a and the RLC entity b to Physical carrier 1 and Physical carrier 2, respectively, and the MAC entity b transmits PDU data transmitted by the RLC entity c and the RLC entity d to Physical carrier 3 and Physical carrier 4, respectively. FIG. 4 shows an example where different MAC entities correspond to a same quantity of RLC entities. However, in practice, different MAC entities may correspond to a same quantity of RLC entities, and may also correspond to different quantities of RLC entities.

Figure 5:
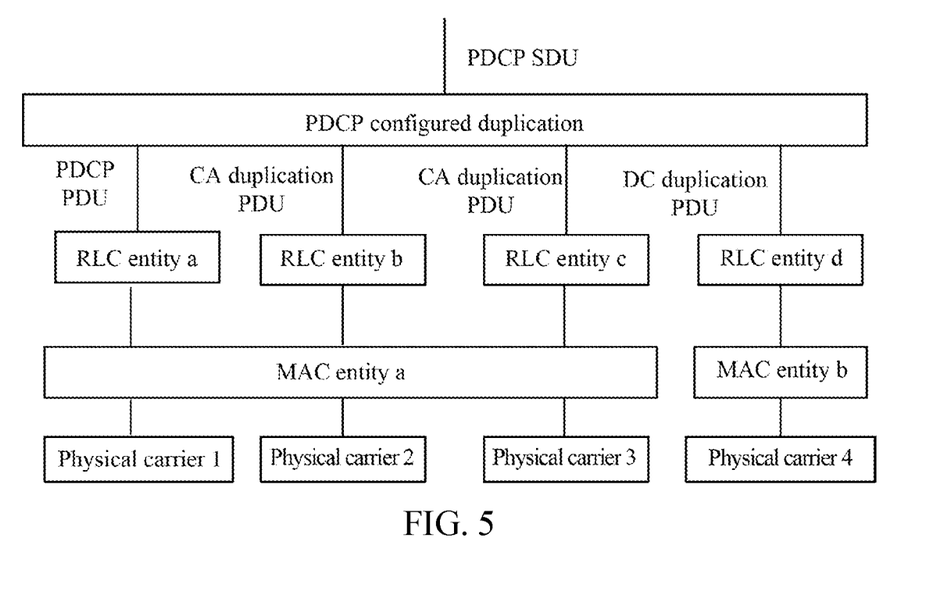
FIG. 5 is a second schematic diagram of a data duplication and transmission mode when a quantity of available logical channels is greater than two according to an implementation of the present disclosure.

FIG. 5 is a second schematic diagram of a mode for duplicating and transmitting data when a quantity of available logical channels is greater than two according to an implementation of the present disclosure. As shown in FIG. 5, MAC entity a corresponds to three RLC entities, and MAC entity b corresponds to one RLC entity.

Figure 6:
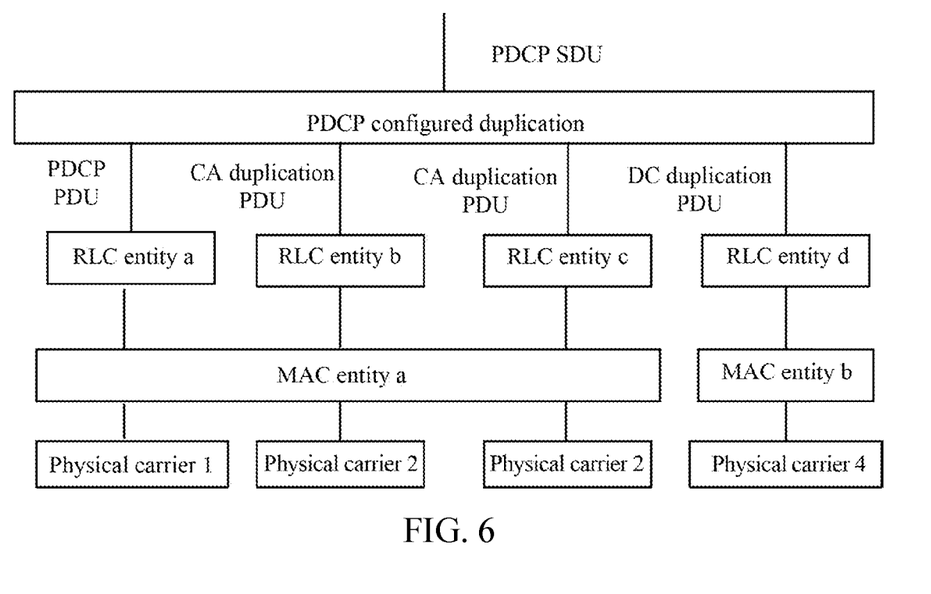
FIG. 6 is a third schematic diagram of a data duplication and transmission mode when a quantity of available logical channels is greater than two according to an implementation of the present disclosure.

FIG. 6 is a third schematic diagram of a mode for duplicating and transmitting data when a quantity of available logical channels is greater than two according to an implementation of the present disclosure. As shown in FIG. 6, MAC entity a corresponds to three RLC entities and MAC entity b corresponds to one MAC entity. When physical layer carriers corresponding to multiple RLC entities corresponding to one MAC entity are same, RLC entities with a same carrier identity are not used at the same time.

Figure 7:
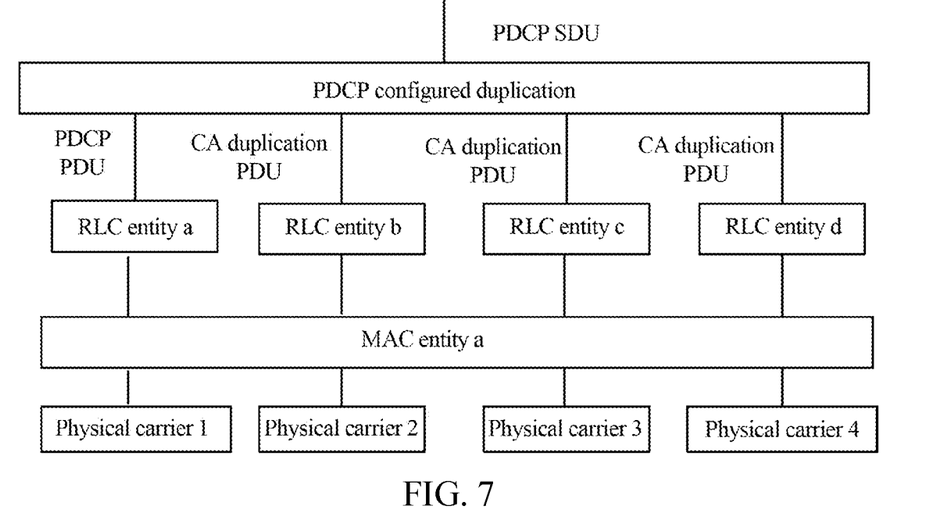
FIG. 7 is a fourth schematic diagram of a data duplication and transmission mode when a quantity of available logical channels is greater than two according to an implementation of the present disclosure.

FIG. 7 is a fourth schematic diagram of a mode for duplicating and transmitting data when a quantity of available logical channels is greater than two according to an implementation of the present disclosure. As shown in FIG. 7, MAC entity a corresponds to four RLC entities.

In FIGS. 4-7, only a quantity of MAC entities being two or one is taken as an example for illustration. In practical applications, the quantity of MAC entities may also be greater than two, such as three or four. Assuming that the quantity of MAC entities is four, MAC entity a may correspond to RLC entity a, MAC entity b may correspond to RLC entity b, MAC entity c may correspond to RLC entity c, and MAC entity d may correspond to RLC entity d. Assuming that the quantity of MAC entities is three, MAC entity a may correspond to RLC entity a and RLC entity b, MAC entity b may correspond to RLC entity c, and MAC entity c may correspond to RLC entity d, etc.

The network device may determine data duplication and transmission information according to any or any combination of the following information: a service characteristic, a service priority, a cell channel quality, a QoS requirement of service, a cell load, a volume of data to be transmitted, etc. Of course, if necessary, the data duplication and transmission information may be further determined with reference to other information.

The network device may notify the terminal device of the data duplication and transmission information through PDCP-config in an RRC reconfiguration message.

When the quantity of logical channels available to data duplication and transmission is greater than two, the data duplication and transmission information may at least include one of the followings: an available logical channel identity, a cell group identity/MAC entity identity corresponding to an available logical channel identity, an available logical channel identity and a corresponding cell group identity/MAC entity identity, etc. Preferably, an available logical channel identity and the corresponding cell group identity/MAC entity identity may be indicated, so that the terminal device can correspond to the relationship between the logical channel and the cell group/MAC entity, and meanwhile it is convenient for that the terminal device can know, when the network device sends a change indication in a later stage, the logical channel corresponding to the indication.

Preferably, the network device may configure data duplication and transmission information for the terminal device in the following manner.

1) Configuration According to a Logical Channel

For example, the network device may implement this by newly adding an IE in PDCP-config, which has an advantage of reusing an existing message as much as possible:

```
    ...
    more ThanOneRLC              SEQUENCE {
        primaryPath                  SEQUENCE {
            cell Group                       CellGroupId
    OPTIONAL, -- Need R
            logicalChannel                   LogicalChannelIdentity
    OPTIONAL -- Need R
        },
        ul-DataSplitThreshold        UL-DataSplitThreshold
    OPTIONAL, -- Cond SplitBearer
        pdcp-Duplication             BOOLEAN
    OPTIONAL -- Need R
    allowedPathlist                  SEQUENCE (SIZE (1..maxNrofServingCells-1)) OF
SallowedPath
    OPTIONAL -- Need R
    allowedPath                  SEQUENCE {
            cellGroup                        CellGroupId
    OPTIONAL -- Need R
            logicalChannel                   LogicalChannelIdentity
    OPTIONAL -- Need R
        },
    }
    OPTIONAL, -- Cond MoreThanOneRLC;
    or:
    ...
        moreThanOneRLC           SEQUENCE {
    ...}
    OPTIONAL, -- CondMoreThanOneRLC
    [[
        more ThanOneRLC-r16              SEQUENCE {
    allowedPathlist                  SEQUENCE (SIZE (1..maxNrofServingCells-1)) OF
SallowedPath
    OPTIONAL, -- Need R
    allowedPath                  SEQUENCE {
            cellGroup                        CellGroupId
    OPTIONAL, -- Need R
            logicalChannel                   LogicalChannelIdentity
    OPTIONAL, -- Need R
        } OPTIONAL, -- Cond MoreThan OneRLC
    ]].
```

2) Configuration according to a cell group
For example, the network device may implement this by newly adding an IE in PDCP-config:

```
    ...
    moreThanOneRLC               SEQUENCE {
        primaryPath                  SEQUENCE {
            cell Group                       CellGroupId
    OPTIONAL, -- Need R
            logicalChannel                   LogicalChannelIdentity
    OPTIONAL -- Need R
        },
        ul-DataSplitThreshold        UL-DataSplitThreshold
    OPTIONAL, -- Cond SplitBearer
        pdcp-Duplication             BOOLEAN
    OPTIONAL -- Need R
    primary CellGroup            SEQUENCE {
            cellGroupIdMcg                   CellGroupId
    OPTIONAL, -- Need R
            logicalChannel                   SEQUENCE (SIZE (1..maxNrofServingCells-1))
OF logicalChannel
    OPTIONAL, -- Need R
        },
```

-continued

```
    secondaryCellGroup               SEQUENCE {
           cellGroupIdScg                            CellGroupId
OPTIONAL, -- Need R
           logicalChannel                SEQUENCE (SIZE (1..maxNrofServingCells-1))
OF logicalChannel
OPTIONAL, -- Need R
       } OPTIONAL,
    }
OPTIONAL, -- Cond MoreThanOneRLC;
  or:
  ...
    moreThanOneRLC          SEQUENCE {
    ...
    }
OPTIONAL, -- Cond MoreThanOneRLC
    more ThanOneRLC-r16              SEQUENCE {
    primary CellGroup                SEQUENCE {
           cellGroupIdMcg                            CellGroupId
OPTIONAL, -- Need R
           logicalChannel                SEQUENCE (SIZE
(1..maxNrofServingCells-1)) OF logicalChannel
OPTIONAL, -- Need R
           },
    secondaryCellGroup               SEQUENCE {
           cellGroupIdScg                            CellGroupId
OPTIONAL, -- Need R
           logicalChannel                SEQUENCE (SIZE
(1..maxNrofServingCells-1)) OF logicalChannel
OPTIONAL, -- Need R
       } OPTIONAL,
    } OPTIONAL, -- Cond MoreThanOneRLC.
```

The data duplication and transmission information configured by the network device for the terminal device may also include: an initial data duplication mode, including activation and deactivation, and transmission configuration information during activation, etc. The transmission configuration information during activation may include used logical channel indication information or the like, i.e., used logical channel indication information during data duplication and transmission, which may, for example, a used logical channel identity, or a corresponding cell group identity/MAC entity identity, etc.

In addition, the data duplication and transmission information may also include: used logical channel indication information after deactivation (the data duplication and transmission mode is not adopted), which may, for example, include a used logical channel identity, or a corresponding cell group identity/MAC entity identity, etc.

The terminal device may perform related configuration according to the configured data duplication and transmission information, and may perform data transmission according to the initial data duplication mode. For example, the initial data duplication mode is activation, then the terminal device may perform data duplication and transmission according to the indication of the used logical channel indication information during data duplication and transmission. In another example, the initial data duplication mode is deactivation, then the terminal device may perform data transmission according to the indication of the used logical channel indication information after deactivation, and if the data duplication and transmission information does not include the used logical channel indication information after deactivation, the terminal device may perform data transmission according to a default or predefined or specific (such as a main RLC entity) logical channel.

Subsequently, when the network device determines that the data duplication mode needs to be changed, it may indicate the terminal device to change the data duplication mode. The change of the data duplication mode may at least include one of the followings: deactivation, activation, change of logical channel for transmitting duplicate data, change of a quantity of logical channels for transmitting duplicate data, etc. Correspondingly, a data duplication mode changing indication may carry one or a combination of information of logical channel for transmitting duplicate data, information of cell group/MAC entity corresponding to a logical channel for transmitting duplicate data, information of carrier for transmitting duplicate data, information of bearer for transmitting duplicate data, etc. The information includes at least identity information. Taking logical channel information as an example, at least logical channel identity information is included.

The network device may notify a change through an RRC message, a Media Access Control Control Element (MAC CE), Downlink Control Information (DCI), or the like.

For example, when determining that a channel quality is higher than a threshold, the network device may indicate, through an MAC CE, the terminal device to deactivate data duplication and transmission, and when determining that the channel quality is lower than the threshold, the network device may indicate, through an MAC CE, the terminal device to activate data duplication and transmission. In another example, the network device may also indicate the terminal device to change the logical channel for transmitting duplicate data or change a quantity of logical channels for transmitting duplicate data. Preferably, a quantity of logical channels used for transmitting duplicate data at the same time or activated at the same time may be two, thus saving air interface resources used for transmitting a same piece of duplicate data.

The terminal device may perform a corresponding change operation according to a data duplication mode changing indication of the network device.

Through the above processing mode, it is caused that a quantity of available logical channels is increased and not limited to two, a range for selection is wider, and a mode of selection is more flexible, thus making it more likely to select a logical channel with a better cell quality or faster resource transmission, further improving data transmission rate and saving air interface resources, etc.

In the prior art, a data duplication and transmission mode based on a bearer granularity is adopted, and it is proposed in the present disclosure that another smaller granularity may also be adopted.

The data duplication and transmission information configured by the network device for the terminal device may include: an initial data duplication mode, including activation and deactivation, and transmission configuration information during activation, etc.

Herein, the transmission configuration information during activation may include: a data duplication granularity, and at least one of the following information: a bearer identity, an MAC entity identity, a cell group identity, or a logical channel identity corresponding to data duplication and transmission. In addition, the data duplication and transmission information may also include: used logical channel indication information after deactivation, etc. Alternatively, the data duplication granularity may not be bound to the transmission configuration information during activation, that is, the data duplication granularity is not contained in the transmission configuration information during activation, but the data duplication granularity information will only be used when data duplication and transmission is activated.

For one bearer, the quantity of logical channels available to data duplication and transmission may be two or greater than two. If it is greater than two, the data duplication and transmission information may also include at least one of the followings: an available logical channel identity, a cell group identity/MAC entity identity corresponding to an available logical channel identity, an available logical channel identity and a corresponding cell group identity/MAC entity identity, etc.

The data duplication granularity may include at least one of the followings: a bearer, a packet, traffic, a logical channel, a quality of service flow, a cell group, or a carrier, etc.

The network device may notify the terminal device of the data duplication granularity information through an RRC reconfiguration message, including, but not limited to, the following modes.

1) Configuration Based on a Bearer

For example, the network device may implement this by newly adding an IE in PDCP-config, which has an advantage of reusing an existing message as much as possible:

```
    ...
        moreThanOneRLC              SEQUENCE {
            primaryPath             SEQUENCE {
                cell Group                  CellGroupId
    OPTIONAL, -- Need R
                logicalChannel              LogicalChannelIdentity
    OPTIONAL -- Need R
            },
            ul-DataSplitThreshold   UL-DataSplitThreshold
    OPTIONAL, -- Cond SplitBearer
            pdcp-Duplication        BOOLEAN
    OPTIONAL -- Need R
            pdcp-DuplicationGranularity     ENUMERATED {radiobearer, packet,
    traffic, logicalchannel, QoS flow
        }
        OPTIONAL -- Need R
        }
        OPTIONAL, -- Cond MoreThanOneRLC.
```

2) Configuration Based on a Logical Channel/Configuration Based on an RLC Entity For example, the network device may newly add an IE corresponding to each logical channel in PDCP-config to notify the data duplication granularity, which has an advantage that different data duplication granularities may be configured for different logical channels of a same bearer:

```
        moreThanOneRLC              SEQUENCE {
            primary Path            SEQUENCE {
                cellGroup                   CellGroupId
    OPTIONAL, -- Need R
                logicalChannel              LogicalChannelIdentity
    OPTIONAL -- Need R
                pdcp-Duplication Granularity    ENUMERATED {radiobearer, packet,
    traffic, logicalchannel, QoS flow
        }
        OPTIONAL -- Need R
            },
            secondaryPath           SEQUENCE {
                cellGroupScg                CellGroupId
    OPTIONAL, -- Need R
                pdcp-DuplicationGranularityScg  ENUMERATED {radiobearer,
    packet, traffic, logicalchannel, QoS flow
        }
```

```
OPTIONAL -- Need R
  },
    ul-DataSplitThreshold        UL-DataSplitThreshold
  OPTIONAL, -- Cond SplitBearer
    pdcp-Duplication             BOOLEAN
  OPTIONAL -- Need R
  }
  OPTIONAL, -- Cond MoreThanOneRLC.
```

3) Configuration Based on a Cell Group

For example, the network device may newly add an IE corresponding to each cell group in PDCP-config to notify the data duplication granularity.

4) Configuration Based on a Carrier

For example, the network device may newly add an IE in physical layer carrier configuration information to notify the data duplication granularity.

Data duplication granularities corresponding to different logical channels may be same or different, and/or, data duplication granularities corresponding to different MAC entities may be same or different, and/or, data duplication granularities corresponding to different cell groups may be same or different.

The terminal device may perform related configuration according to the configured data duplication and transmission information, and may perform data transmission according to an initial data duplication mode.

For example, if the initial data duplication mode in the data duplication and transmission information acquired by the terminal device is activation, the data duplication granularity is a data packet, the corresponding bearer identity is 1, and the corresponding logical channel identities are 1 and 2, then the terminal device may know that data duplication and transmission need to be performed for a certain or some certain packets carried on bearer 1, the duplicated data is transmitted through logical channels 1 and 2, etc.

Subsequently, when the network device determines that the data duplication mode needs to be changed, it may indicate the terminal device to change the data duplication mode. The change of the data duplication mode may at least include one of the followings: deactivation, activation, change of a logical channel for transmitting duplicate data, change of the quantity of logical channels for transmitting duplicate data, change of the data duplication granularity, etc. Correspondingly, a data duplication mode changing indication may carry one or a combination of information of a logical channel for transmitting duplicate data, information of a cell group/MAC entity corresponding to a logical channel for transmitting duplicate data, information of a carrier for transmitting duplicate data, information of a bearer for transmitting duplicate data, etc. The information at least includes identity information. In an example of logical channel information, it at least includes logical channel identity information.

The network device may notify a change through an RRC message, an MAC CE, DCI or the like.

The terminal device may perform a corresponding change operation according to a data duplication mode changing indication of the network device.

Through the above processing mode, another control granularity of data duplication and transmission is added, thereby improving flexibility of data duplication and transmission, further improving data transmission rate and saving air interface resources, etc.

The above is the description of the solution of the present disclosure mainly from a network device side, and next, the solution of the present disclosure will be described further from a terminal device side.

Figure 8:
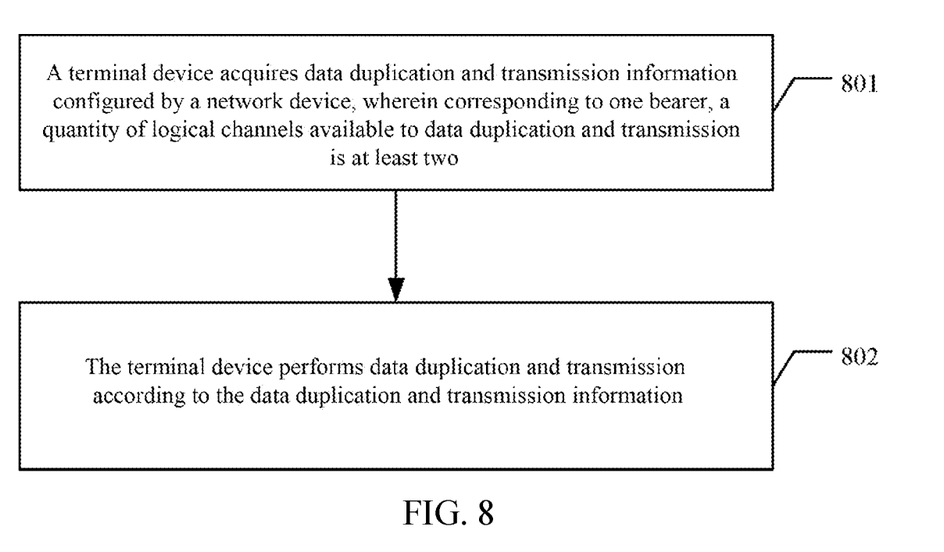
FIG. 8 is a schematic flowchart of a method for configuring data duplication and transmission according to an implementation of the present disclosure.

FIG. 8 is a schematic flowchart of a method for configuring data duplication and transmission according to an implementation of the present disclosure. As shown in FIG. 8, a following specific implementation is included.

In 801, a terminal device acquires data duplication and transmission information configured by a network device, wherein corresponding to one bearer, a quantity of logical channels available to data duplication and transmission is at least two.

In 802, the terminal device performs data duplication and transmission according to data duplication and transmission information.

Compared with an existing mode, in the present implementation, a quantity of available logical channels may be increased to be greater than two, another data duplication granularity than a bearer may be introduced, or two modes may be used in combination.

A data duplication granularity may include at least one of the followings: a bearer, a packet, traffic, a logical channel, a quality of service flow, a cell group, a carrier, etc.

The data duplication and transmission information may include: an initial data duplication mode, including activation and deactivation, and transmission configuration information during activation, etc. Among them, the transmission configuration information during activation may include used logical channel indication information, etc. Alternatively, the transmission configuration information during activation may include: the data duplication granularity, and at least one of the following information: a bearer identity, an MAC entity identity, a cell group identity, or a logical channel identity corresponding to data duplication and transmission.

When the quantity of available logical channels is greater than two, the data duplication and transmission information may further include at least one of the followings: an available logical channel identity, a cell group identity/MAC entity identity corresponding to an available logical channel identity, an available logical channel identity and a corresponding cell group identity/MAC entity identity, etc.

Regardless of whether the quantity of available logical channels is two or greater than two, the corresponding data duplication and transmission information may further include: used logical channel indication information after deactivation, etc.

In addition, data duplication granularities corresponding to different logical channels are same or different, and/or data duplication granularities corresponding to different media access control entities are same or different, and/or, data duplication granularities corresponding to different cell groups are same or different.

The terminal device may perform related configuration according to the configured data duplication and transmission information, and may perform data transmission according to the initial data duplication mode.

In an example, the initial data duplication mode is activation, then the terminal device may perform data duplication and transmission according to an indication of used logical channel indication information during data duplication and transmission.

In another example, the initial data duplication mode is deactivation, and the terminal device may perform data transmission according to the indication of used logical channel indication information after deactivation; and if the data duplication and transmission information does not include the used logical channel indication information after deactivation, the terminal device may perform data transmission according to a default or predefined or specific (such as a main RLC entity) logical channel.

In a further example, the initial data duplication mode in the data duplication and transmission information acquired by the terminal device is activation, the data duplication granularity is a data packet, the corresponding bearer identity is 1, and the corresponding logical channel identities are 1 and 2, then the terminal device may know that data duplication and transmission need to be performed for a certain or some certain packets carried on bearer 1, and the duplicated data is transmitted through logical channels 1 and 2, etc.

The terminal device may also acquire a data duplication mode changing indication of the network device, and perform a change operation according to the data duplication mode changing indication. The change operation may at least include one of the followings: activation, deactivation, change of the logical channel for transmitting duplicate data, change of the quantity of logical channels for transmitting duplicate data, change of the data duplication granularity, etc. Correspondingly, a data duplication mode changing indication may carry one or a combination of information of a logical channel for transmitting duplicate data, information of a cell group/MAC entity corresponding to a logical channel for transmitting duplicate data, information of a carrier for transmitting duplicate data, information of a bearer for transmitting duplicate data, etc. The information at least includes identity information. In an example of logical channel information, it at least includes logical channel identity information.

It should be noted that all the aforementioned bearers may be Signaling Radio Bearers (SRB) or Data Radio Bearers (DRB).

It should be noted that for the sake of brief description, the aforementioned method implementations are expressed as combinations of a series of actions, but a person skilled in the art should know that the present disclosure is not limited by the described sequence of actions, since according to the present disclosure, some acts may be performed in other sequences or simultaneously. Secondly, a person skilled in the art should also know that the implementations described in the specification all belong to preferred implementations, and the actions and the modules involved are not necessarily essential to the present disclosure.

In the above-described implementations, the description of each implementation has its own emphasis, and for a part which is not described in detail in a certain implementation, related descriptions in other implementations may be referred to.

The above is the description of method implementations, and the solution of the present disclosure will be further described below through apparatus implementations.

Figure 9:
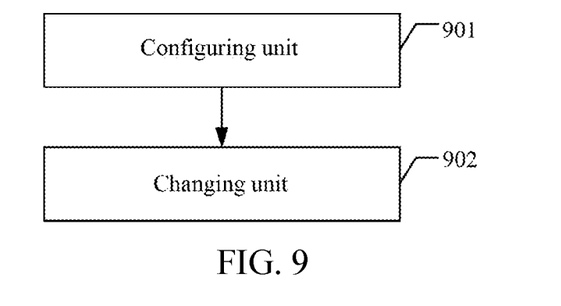
FIG. 9 is a first schematic structural diagram of an apparatus for duplicating and transmitting data according to an implementation of the present disclosure.

FIG. 9 is a first schematic structural diagram of an apparatus for duplicating and transmitting data according to an implementation of the present disclosure. The apparatus may be applied to a network device, as shown in FIG. 9, and may include a configuring unit 901. The configuring unit 901 is configured to configure data duplication and transmission information for a terminal device, wherein corresponding to one bearer, a quantity of logical channels available to data duplication and transmission is at least two, and the data duplication and transmission information is used for performing data duplication and transmission by the terminal device.

The data duplication and transmission information may include: an initial data duplication mode, including activation and deactivation, and transmission configuration information during activation, etc. Among them, the transmission configuration information during activation may include used logical channel indication information, etc. Alternatively, the transmission configuration information during activation may include: a data duplication granularity, and at least one of the following information: a bearer identity, an MAC entity identity, a cell group identity or a logical channel identity corresponding to data duplication and transmission, etc.

When the quantity of available logical channels is greater than two, the data duplication and transmission information may further at least include one of the followings: an available logical channel identity, a cell group identity/MAC entity identity corresponding to the available logical channel identity, an available logical channel identity and a corresponding cell group identity/MAC entity identity, etc.

Regardless of whether the quantity of available logical channels is two or greater than two, the corresponding data duplication and transmission information may further include: used logical channel indication information after deactivation, etc.

The data duplication granularity may at least include one of the followings: a bearer, a packet, traffic, a logical channel, a quality of service flow, a cell group, a carrier, etc.

Data duplication granularities corresponding to different logical channels are same or different, and/or data duplication granularities corresponding to different media access control entities are same or different, and/or data duplication granularities corresponding to different cell groups are same or different.

The apparatus shown in FIG. 9 may also further include: a changing unit 902, configured to indicate, when it is determined that a data duplication mode needs to be changed, the terminal device to change the data duplication mode. The change of the data duplication mode may at least include one of the followings: activation, deactivation, change of the logical channel for transmitting duplicate data, change of the quantity of logical channels for transmitting duplicate data, change of the data duplication granularity, etc.

Figure 10:
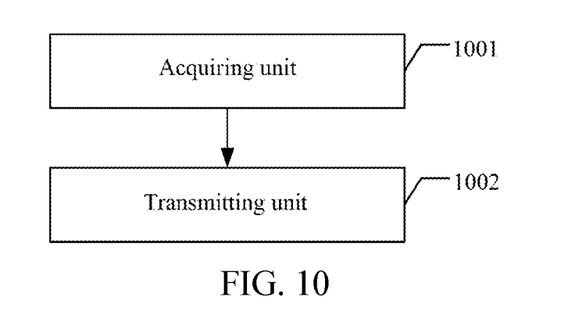
FIG. 10 is a second schematic structural diagram of an apparatus for duplicating and transmitting data according to an implementation of the present disclosure.

FIG. 10 is a second schematic structural diagram of an apparatus for duplicating and transmitting data according to an implementation of the present disclosure. The apparatus may be applied to a terminal device, as shown in FIG. 10, and may include an acquiring unit 1001 and a transmitting unit 1002.

The acquiring unit 1001 is configured to acquire data duplication and transmission information configured by a network device, wherein corresponding to one bearer, a quantity of logical channels available to data duplication and transmission is at least two.

The transmitting unit 1002 is configured to perform data duplication and transmission according to the data duplication and transmission information.

The data duplication and transmission information may further include: initial data duplication mode, including activation and deactivation, and transmission configuration information during activation, etc. Among them, the transmission configuration information during activation may include used logical channel indication information, etc. Alternatively, the transmission configuration information during activation may include: a data duplication granularity, and at least one of the following information: a bearer identity, an MAC entity identity, a cell group identity or a logical channel identity corresponding to data duplication and transmission, etc.

When the quantity of available logical channels is greater than two, the data duplication and transmission information may further include at least one of the followings: an available logical channel identity, a cell group identity/MAC entity identity corresponding to the available logical channel identity, an available logical channel identity and a corresponding cell group identity/MAC entity identity, etc.

Regardless of whether the quantity of available logical channels is two or greater than two, the corresponding data duplication and transmission information may further include: used logical channel indication information after deactivation, etc.

The data duplication granularity may at least include one of the followings: a bearer, a packet, traffic, a logical channel, a quality of service flow, a cell group or a carrier.

Data duplication granularities corresponding to different logical channels are same or different, and/or data duplication granularities corresponding to different media access control entities are same or different, and/or data duplication granularities corresponding to different cell groups are same or different.

The acquiring unit 1001 may also be further configured to acquire a data duplication mode changing indication of a network device. Correspondingly, the transmitting unit 1002 may also be further configured to perform a change operation according to the data duplication mode changing indication. The change operation may at least include one of the followings: activation, deactivation, change of the logical channel for transmitting duplicate data, change of the quantity of logical channels for transmitting duplicate data, change of the data duplication granularity, etc.

For a specific working flow of the apparatus implementations shown in FIG. 9 and FIG. 10, reference may be made to relevant description in the aforementioned method implementations, which will not be repeated.

Figure 11:
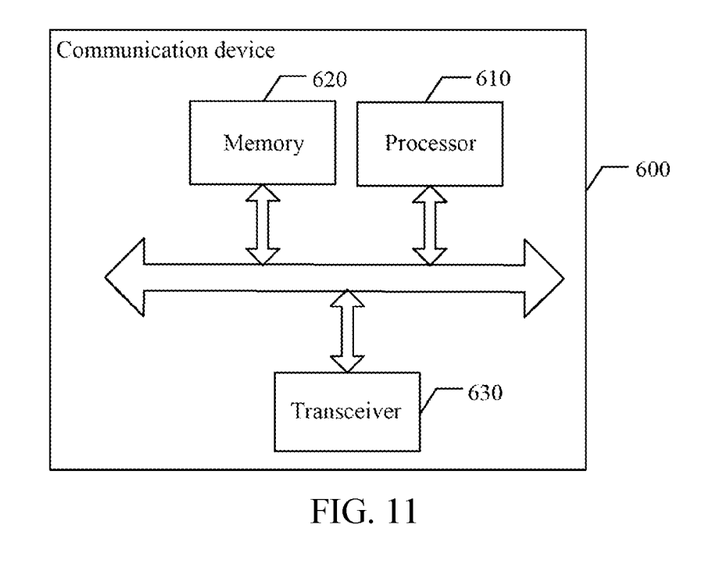
FIG. 11 is a schematic structural diagram of a communication device 600 according to an implementation of the present disclosure.

FIG. 11 is a schematic structural diagram of a communication device 600 according to an implementation of the present disclosure. The communication device 600 shown in FIG. 11 includes a processor 610. The processor 610 may call a computer program from a memory 620 and run the computer program, to implement the methods in the implementations of the present disclosure.

Optionally, as shown in FIG. 11, the communication device 600 may further include a memory 620. Herein, the processor 610 may call a computer program from a memory 620 and run the computer program, to implement the methods in the implementations of the present disclosure.

Herein the memory 620 may be a separate device independent of the processor 610 or may be integrated in the processor 610.

Optionally, as shown in FIG. 11, the communication device 600 may further include a transceiver 630, and the processor 610 may control the transceiver 630 to communicate with other devices. Specifically, information or data may be sent to other devices, or information or data sent by other devices may be received.

Herein the transceiver 630 may include a transmitter and a receiver. The transceiver 630 may further include antennas, wherein a quantity of antennas may be one or more.

Optionally, the communication device 600 may be specifically a network device of the implementation of the present disclosure, and the communication device 600 may implement the corresponding processes implemented by the network device in various methods of the implementations of the present disclosure, which will not be repeated here for brevity.

Optionally, the communication device 600 may be specifically a mobile terminal/terminal device of the implementation of the present disclosure, and the communication device 600 may implement the corresponding processes implemented by the mobile terminal/terminal device in the various methods of the implementations of the present disclosure, which will not be repeated here for brevity.

Figure 12:
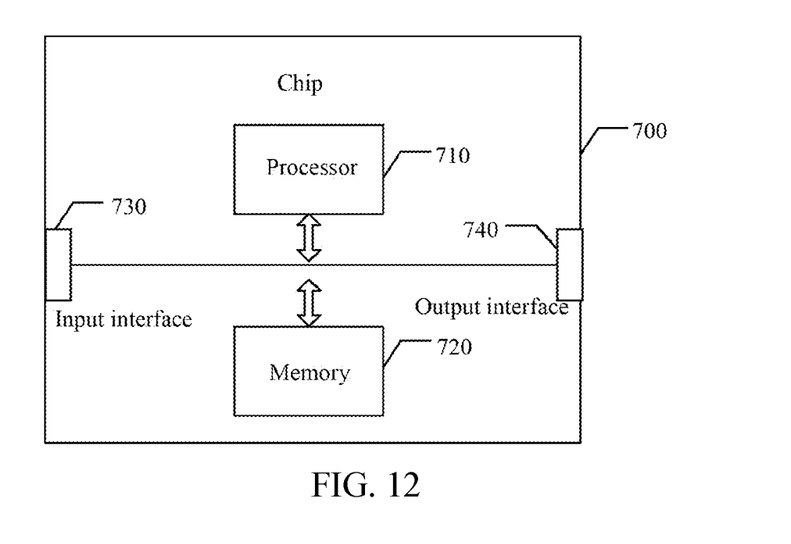
FIG. 12 is a schematic structural diagram of a chip 700 according to an implementation of the present disclosure.

FIG. 12 is a schematic structural diagram of a chip 700 according to an implementation of the present disclosure. The chip 700 shown in FIG. 12 includes a processor 710. The processor 710 may call a computer program from a memory and run the computer program, to implement the methods in the implementations of the present disclosure.

Optionally, as shown in FIG. 12, the chip 700 may further include a memory 720. Herein, the processor 710 may call a computer program from the memory 720 and run the computer program, to implement the methods in the implementations of the present disclosure.

Herein, the memory 720 may be a separate device independent of the processor 710, or may be integrated in the processor 710.

Optionally, the chip 700 may further include an input interface 730. Herein, the processor 710 may control the input interface 730 to communicate with other devices or chips. Specifically, information or data sent by other devices or chips may be acquired.

Optionally, the chip 700 may further include an output interface 740. Herein, the processor 710 may control the output interface 740 to communicate with other devices or chips. Specifically, information or data may be outputted to other devices or chips.

Optionally, the chip may be used in a network device of the implementation of the present disclosure, and the chip may implement the corresponding processes implemented by the network device in various methods of the implementations of the present disclosure, which will not be repeated here for brevity.

Optionally, the chip may be used in a mobile terminal/terminal device of the implementation of the present disclosure, and the chip may implement the corresponding processes implemented by the mobile terminal/terminal device in the various methods of the implementations of the present disclosure, which will not be repeated here for brevity.

It should be understood that the chip mentioned in the implementation of the present disclosure may also be referred to as a system-level chip, a system chip, a chip system or a system chip-on-chip, etc.

Figure 13:
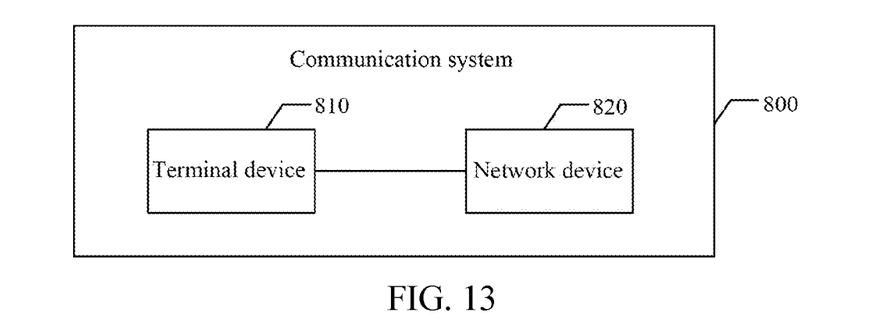
FIG. 13 is a schematic block diagram of a communication system 800 according to an implementation of the present disclosure.

FIG. 13 is a schematic block diagram of a communication system 800 according to an implementation of the present disclosure. As shown in FIG. 13, the communication system 800 includes a terminal device 810 and a network device 820.

Herein, the terminal device 810 may be configured to implement the corresponding functions implemented by the terminal device in the above-mentioned methods, and the network device 820 may be configured to implement the corresponding functions implemented by the network device in the above-mentioned methods, which will not be repeated here for brevity.

It should be understood that the processor in the implementation of the present disclosure may be an integrated circuit chip having a signal processing capability. In an implementation process, the acts of the foregoing method implementations may be accomplished by an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The methods, acts and logical block diagrams disclosed in the implementations of the present disclosure may be implemented or executed. The general purpose processor may be a microprocessor, or the processor may be any conventional processor or the like. The acts of the methods disclosed with reference to the implementations of the present disclosure may be directly embodied as being executed by a hardware decoding processor, or may be executed and accomplished by a combination of hardware and software modules in the decoding processor. The software modules may be located in a storage medium commonly used in the art, such as a random memory, a flash memory, a read-only memory, a programmable read-only memory or an electrically erasable programmable memory, or a register, etc. The storage medium is located in a memory, and the processor reads information in the memory and accomplishes the acts of the above methods in combination with hardware thereof.

It may be understood that the memory in the implementation of the present disclosure may be a transitory memory or a non-transitory memory, or may include both a transitory memory and a non-transitory memory. Herein, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and the methods described herein is intended to include, without being limited to, these and any other suitable types of memories.

An implementation of the present disclosure further provides a computer readable storage medium, configured to store a computer program.

Optionally, the computer readable storage medium may be applied in a network device of the implementation of the present disclosure, and the computer program causes a computer to perform the corresponding processes implemented by the network device in various methods of the implementations of the present disclosure, which will not be repeated here for brevity.

Optionally, the computer readable storage medium may be applied in a mobile terminal/terminal device of the implementation of the present disclosure, and the computer program causes a computer to perform the corresponding processes implemented by the mobile terminal/terminal device in various methods of the implementations of the present disclosure, which will not be repeated here for brevity.

An implementation of the present disclosure further provides a computer program product, including computer program instructions.

Optionally, the computer program product may be applied in a network device of the implementation of the present disclosure, and the computer program instructions cause a computer to perform the corresponding processes implemented by the network device in various methods of the implementations of the present disclosure, which will not be repeated here for brevity.

Optionally, the computer program product may be applied in a mobile terminal/terminal device of the implementation of the present disclosure, and the computer program instructions cause a computer to perform the corresponding processes implemented by the mobile terminal/terminal device in various methods of the implementations of the present disclosure, which will not be repeated here for brevity.

An implementation of the present disclosure further provides a computer program.

Optionally, the computer program may be applied in a network device of the implementation of the present disclosure. When being run on a computer, the computer program causes the computer to perform the corresponding processes implemented by the network device in various methods of the implementations of the present disclosure, which will not be repeated here for brevity.

Optionally, the computer program may be applied in a mobile terminal/terminal device of the implementation of the present disclosure. When being run on a computer, the computer program causes the computer to perform the corresponding processes implemented by the mobile terminal/terminal device in various methods of the implementations of the present disclosure, which will not be repeated here for brevity.

Those of ordinary skills in the art may recognize that exemplary units and algorithm acts described in combination with the implementations disclosed herein can be accomplished in electronic hardware, or a combination of computer software and electronic hardware. Whether these functions are performed in hardware or software depends on the specific application and design constraint conditions of the technical solutions. Professional technicians may use different methods to implement the described functions in respect to each particular application, but such implementation should not be considered to be beyond the scope of the present disclosure.

Those skilled in the art may clearly understand that for convenience and conciseness of description, as to specific working processes of the systems, the apparatuses and units described above, reference may be made to the corresponding processes in the aforementioned method implementations, which will not be repeated here.

In several implementations provided by the present disclosure, it should be understood that the disclosed systems, apparatuses and methods may be implemented in other ways. For example, the apparatus implementations described above are only illustrative, for example, division of the units is only a logical function division, and there may be other division manners in actual implementations, for example, multiple units or components may be combined or integrated into another system, or some features may be ignored or not executed. At the other point, the mutual coupling or direct coupling or a communication connection shown or discussed may be indirect coupling or a communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Part or all of the units therein may be selected according to actual needs to achieve the objects of the solutions of the present implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device, or the like) to perform all or part of the acts of the methods described in various implementations of the present disclosure. And the aforementioned storage medium includes various media which may store program codes, such as a USB flash disk, a removable hard disk, a ROM, a RAM, a magnetic disk, or an optical disk, etc.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

What is claimed is:

1. A method for configuring data duplication and transmission, comprising:
    acquiring, by a terminal device, data duplication and transmission information configured by a network device, wherein corresponding to one bearer, a quantity of logical channels available to data duplication and transmission is at least two; and
    performing, by the terminal device, the data duplication and transmission according to the data duplication and transmission information;
    wherein, when the data duplication and transmission information does not include used logical channel indication information after deactivation, performing, by the terminal device, data transmission according to a main RLC entity logical channel;
    wherein the data duplication and transmission information comprises:
    an initial data duplication mode, comprising activation and deactivation; and
    transmission configuration information for the activation;
    wherein the transmission configuration information for the activation comprises: a data duplication granularity, and at least one of the following information: a bearer identity, an MAC entity identity, a cell group identity or a logical channel identity corresponding to the data duplication and transmission;
    wherein data duplication granularities corresponding to different logical channels are same or different; and/or,
    data duplication granularities corresponding to different media access control entities are same or different; and/or,
    data duplication granularities corresponding to different cell groups are same or different.

2. The method according to claim 1, wherein
when the quantity of logical channels available to the data duplication and transmission is greater than two, the data duplication and transmission information comprises at least one of the followings: an available logical channel identity, a cell group identity/Media Access Control (MAC) entity identity corresponding to an available logical channel identity, or, an available logical channel identity and a corresponding cell group identity/MAC entity identity.

3. The method according to claim 1, wherein
the transmission configuration information for the activation comprises: used logical channel indication information.

4. The method according to claim 1, wherein
the data duplication and transmission information further comprises: used logical channel indication information after deactivation.

5. The method according to claim 1, wherein
the data duplication granularity comprises at least one of the followings: a bearer, a packet, traffic, a logical channel, a quality of service flow, a cell group or a carrier.

6. The method according to claim 1, wherein
the method further comprises: acquiring, by the terminal device, a data duplication mode changing indication from the network device, and performing a change operation according to the data duplication mode changing indication;
the change operation comprising at least one of the followings: activation, deactivation, change of the logical channel for transmitting duplicate data, change of a quantity of logical channels for transmitting duplicate data, and change of the data duplication granularity.

7. An apparatus for configuring data duplication and transmission, wherein the apparatus is applied to a terminal device and comprises a processor, a transceiver and a memory, wherein the memory is configured to store a computer program, the transceiver is configured to communicate with other devices under control of the processor, and the processor is configured to call and run the computer program stored in the memory to
    acquire data duplication and transmission information configured by a network device, wherein corresponding to one bearer, a quantity of logical channels available to data duplication and transmission is at least two; and
    perform the data duplication and transmission according to the data duplication and transmission information;
    wherein, the processor is configured to: when the data duplication and transmission information does not include used logical channel indication information after deactivation, perform data transmission according to a main RLC entity logical channel;
    wherein the data duplication and transmission information comprises:
    an initial data duplication mode, comprising activation and deactivation; and
    transmission configuration information for the activation;

wherein the transmission configuration information for the activation comprises: a data duplication granularity, and at least one of the following information: a bearer identity, an MAC entity identity, a cell group identity, or a logical channel identity corresponding to the data duplication and transmission;

wherein data duplication granularities corresponding to different logical channels are same or different; and/or, data duplication granularities corresponding to different media access control entities are same or different; and/or, data duplication granularities corresponding to different cell groups are same or different.

8. The apparatus according to claim 7, wherein when the quantity of logical channels available to the data duplication and transmission is greater than two, the data duplication and transmission information comprises at least one of the followings: an available logical channel identity, a cell group identity/Media Access Control (MAC) entity identity corresponding to an available logical channel identity, or, an available logical channel identity and a corresponding cell group identity/MAC entity identity.

9. The apparatus according to claim 7, wherein the transmission configuration information for the activation comprises: used logical channel indication information.

10. The apparatus according to claim 7, wherein the data duplication and transmission information further comprises: used logical channel indication information after deactivation.

11. The apparatus according to claim 7, wherein the data duplication granularity comprises at least one of the followings: a bearer, a packet, traffic, a logical channel, a quality of service flow, a cell group, or a carrier.

12. The apparatus according to claim 7, wherein the processor is configured to:

acquire a data duplication mode changing indication from the network device;

perform a change operation according to the data duplication mode changing indication;

the change operation at least comprising one of the followings: activation, deactivation, change of the logical channel for transmitting duplicate data, change of a quantity of logical channels for transmitting duplicate data, and change of the data duplication granularity.

13. A non-transitory computer-readable storage medium, configured to store a computer program, wherein the computer program causes a computer to:

acquire data duplication and transmission information configured by a network device, wherein corresponding to one bearer, a quantity of logical channels available to data duplication and transmission is at least two; and perform the data duplication and transmission according to the data duplication and transmission information;

wherein the computer program causes the computer to: when the data duplication and transmission information does not include used logical channel indication information after deactivation, perform data transmission according to a main RLC entity logical channel;

wherein the data duplication and transmission information comprises:

an initial data duplication mode, comprising activation and deactivation; and transmission configuration information for the activation;

wherein the transmission configuration information for the activation comprises: a data duplication granularity, and at least one of the following information: a bearer identity, an MAC entity identity, a cell group identity, or a logical channel identity corresponding to the data duplication and transmission;

wherein data duplication granularities corresponding to different logical channels are same or different; and/or, data duplication granularities corresponding to different media access control entities are same or different; and/or, data duplication granularities corresponding to different cell groups are same or different.

* * * * *